United States Patent [19]

Collins, Jr.

[11] Patent Number: 4,537,554

[45] Date of Patent: Aug. 27, 1985

[54] SHUTTLE CAR LOADING SYSTEM

[75] Inventor: Earl R. Collins, Jr., La Canada, Calif.

[73] Assignee: The United States of America as represented by the Administrator of the National Aeronautics and Space Administration, Washington, D.C.

[21] Appl. No.: 457,990

[22] Filed: Jan. 14, 1983

[51] Int. Cl.³ .............................................. B65G 67/06
[52] U.S. Cl. .................................... 414/328; 414/288; 414/373; 414/786
[58] Field of Search ............... 414/293, 294, 300, 304, 414/305, 345, 373, 398, 400, 323, 325, 509, 510, 511, 512, 786, 399, 347, 348, 328; 198/347, 348, 560, 577; 222/559, 561; 193/3; 298/27, 28

[56] References Cited

U.S. PATENT DOCUMENTS

| | | | |
|---|---|---|---|
| 1,794,318 | 2/1931 | Perkins et al. | 414/512 X |
| 2,663,439 | 12/1953 | Phelps | 414/522 |
| 3,054,160 | 9/1962 | Le Tourneau | 414/522 X |
| 3,349,931 | 10/1967 | Wagner | 414/512 |
| 3,353,693 | 11/1967 | Zink | 414/554 |
| 3,826,387 | 7/1974 | Galis | 414/522 X |
| 4,027,805 | 6/1977 | Beumer et al. | 414/84 |
| 4,111,485 | 9/1978 | Martin et al. | 414/510 X |
| 4,236,630 | 12/1980 | Sander et al. | 414/323 X |
| 4,353,676 | 10/1982 | Mikulich et al. | 414/512 |
| 4,372,730 | 2/1983 | Ladt | 222/559 X |

Primary Examiner—Robert J. Spar
Assistant Examiner—Stuart J. Millman
Attorney, Agent, or Firm—Paul F. McCaul; John R. Manning; Thomas H. Jones

[57] ABSTRACT

A system is described for loading newly mined material such as coal, into a shuttle car, at a location near the mine face where there is only a limited height available for a loading system. The system includes a storage bin (18) having several telescoping bin sections (20–23), and a shuttle car (14) having a bottom wall (64) that can move under the bin. With the bin in an extended position and filled with coal (FIG. 3), the bin sections can be telescoped (FIG. 4) to allow the coal to drop out of the bin sections and into the shuttle car, to quickly load the car. The bin sections can then be extended, so they can be slowly filled with more coal while awaiting another shuttle car.

3 Claims, 7 Drawing Figures

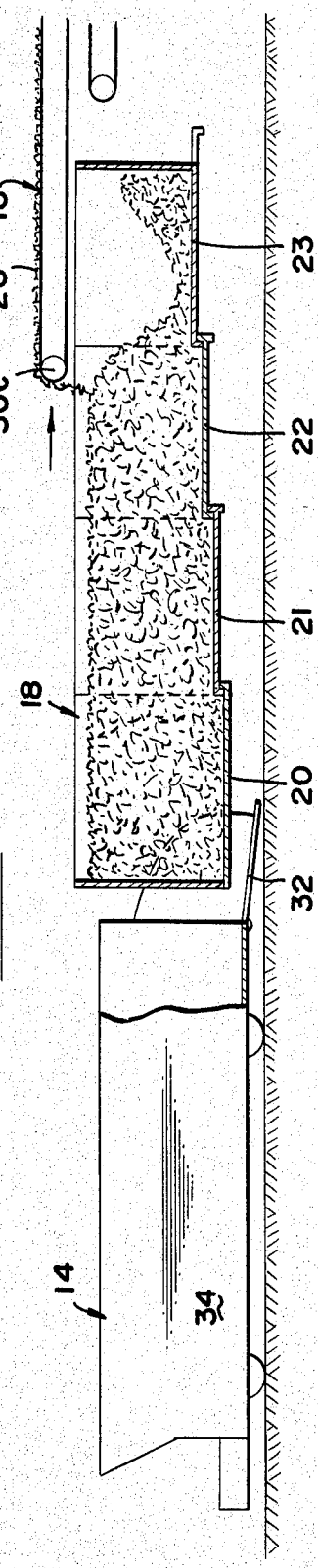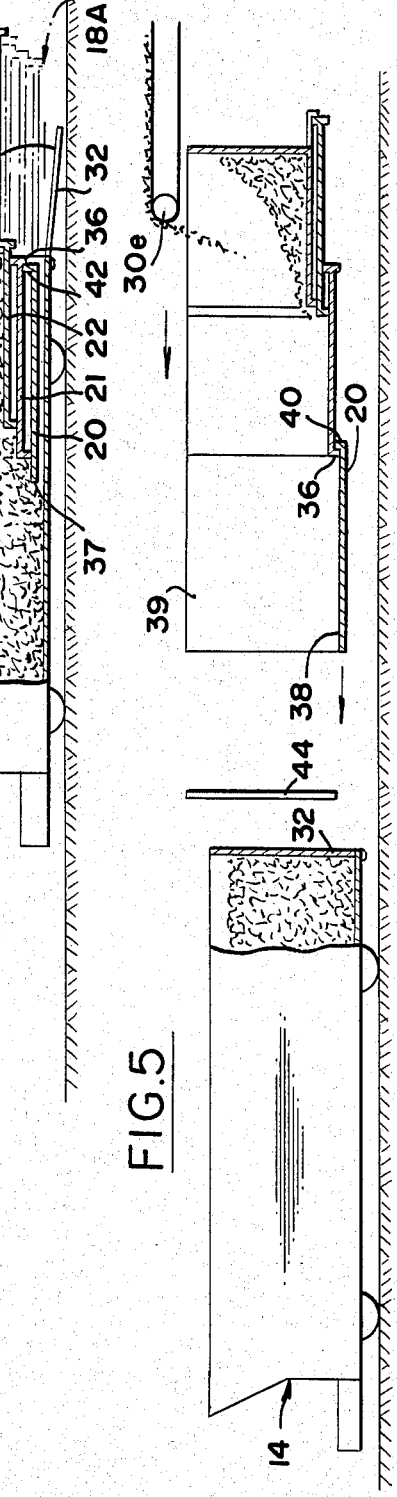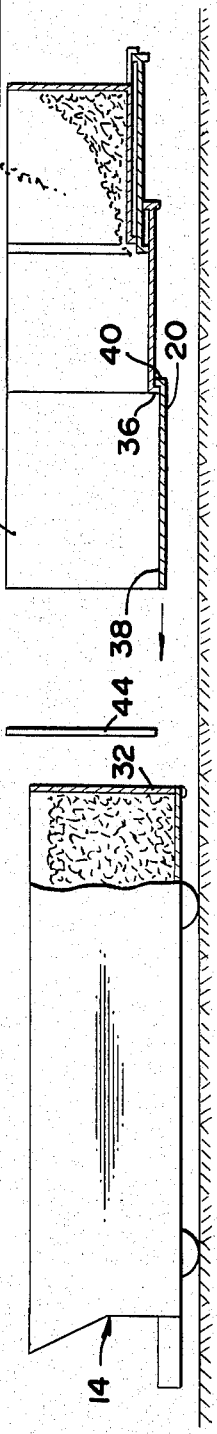

SHUTTLE CAR LOADING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat, 435; 42 USC 2457).

BACKGROUND OF THE INVENTION

The usual coal seam is only a few feet high, so a low tunnel leads to the mine face where coal from a mining machine must be loaded onto a shuttle car. The lack of headroom prevents the use of fast bulk loaders such as an overhead hopper that can store mined coal and dump it all at once into a shuttle car. As a result, slow conveyors are used which require only inches clearance over a low-slung shuttle car, and the car must remain in place while it is slowly filled. This generally requires that the mining machine stop operating when a loaded shuttle car moves away and while waiting for a next one to move into position. As a result, a surplus of shuttle cars and their drivers are required, with most of the working time of the cars being spent in waiting for their turn to get into the loading position, and in waiting to be loaded. A system which could avoid the need for surplus shuttle cars and their drivers, and which enabled rapid loading of a car when it reached the area of the mine working face, all while avoiding the need to intermittently stop operation of the mining machine, would be of considerable value.

SUMMARY OF THE INVENTION

In accordance with one embodiment of the present invention, apparatus is provided for storing newly mined pieces of material and quickly loading it onto a shuttle car, all in the confines of a mine shaft of small height. The apparatus includes a bin having a first bottom wall which can be moved in a largely horizontal direction to open most of the bottom area of the bin, so material can fall out. A shuttle car bas a bottom wall which can fit under the bin, and has sides that fit on opposite sides of the bin, so that when the bottom wall of the bin is opened mined material can be dumped into the shuttle car to quickly load it so the car can be driven away. The bottom wall of the bin can then be moved to close it, so more mined material can be gradually dropped into the bin to refill it until another shuttle car arrives.

The bin can include several bin sections that each have a bottom wall and a pair of side walls, and with the sections constructed so they can telescope together to progressively dump the mined material held by the sections both downwardly and sidewardly into a shuttle car.

The novel features of the invention are set forth with particularity in the appended claims. The invention will be best understood from the following description when read in conjunction with the accompanying drawings.

BRIEF DESCRIPTION OF THE DRAWINGS

FIG. 3 is a view similar to FIG. 2, but showing the system at a later time during the filling of the storage bin, and with the shuttle car approaching the bin.

FIG. 4 is a view similar to FIG. 3, but showing the system at a later time, in the course of telescoping the bin to dump material therefrom into the shuttle car.

FIG. 5 is a view similar to FIG. 4, but showing the system at a later time when the filled shuttle car is leaving the storage bin and the bin is being extended so it can hold another large quantity of mined material.

DESCRIPTION OF THE PREFERRED EMBODIMENT

Figure 1:
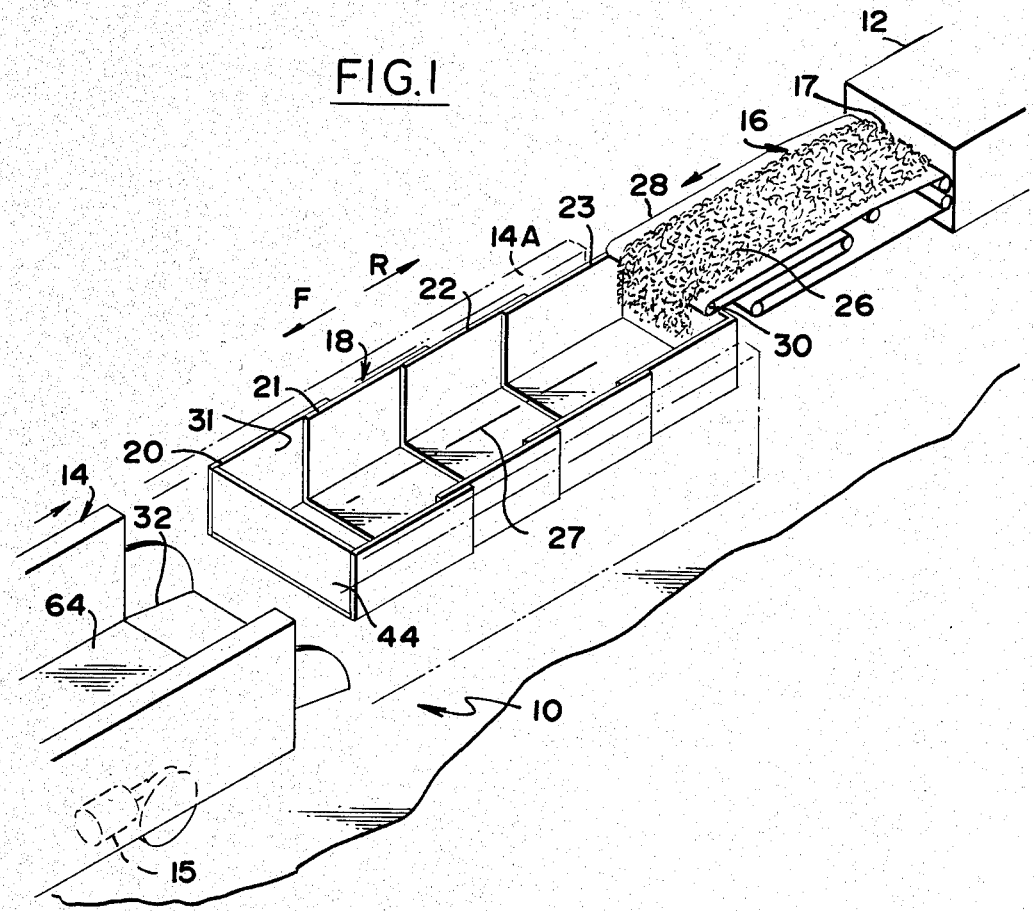
FIG. 1 is a simplified perspective view of a mineral transfer system constructed in accordance with one embodiment of the present invention.
Figure 2:
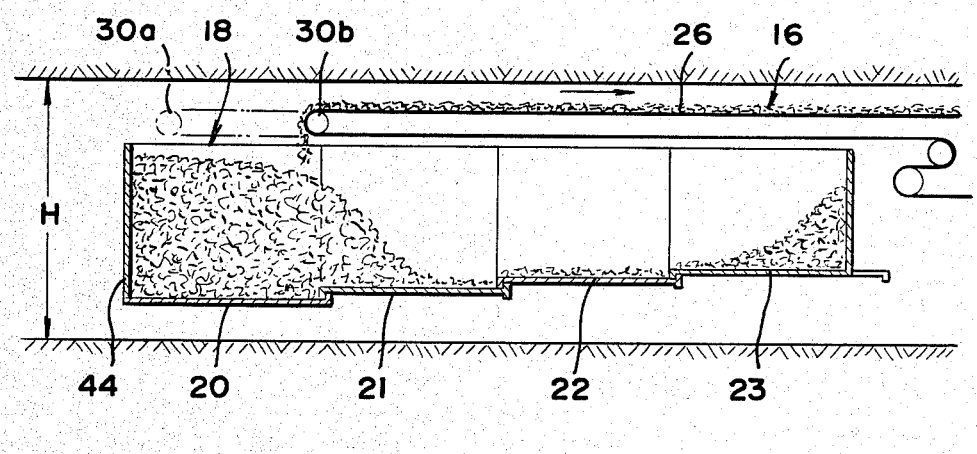
FIG. 2 is a sectional side view of the system of FIG. 1, shown during an early time in the filling of the storage bin.

FIG. 1 illustrates a transfer system 10, for transporting pieces of mineral, or ore, such as coal that has been newly mined by a mining machine 12 at the mine face of a tunnel, to transport the mined material to a central location in the mine from which it can be removed. Many minerals such as coal may occur in seams that are only a few feet high, so the equipment for transferring the mined material to a shuttle car 14 has to fit into a mine tunnel of relatively small height H (FIG. 2). The system includes a conveyor belt device 16 having a rear end 17 on which mine material is placed, and a storage bin 18 located in front of the conveyor device. The bin holds material dumped into it by the conveyor and transfers the stored material to the shuttle car 14. The car includes electric motors 15 powered by batteries in the sides of the car.

The bin 18 includes four sections 20–23 that can lie in the extended position shown in FIG. 1 to store a large quantity of coal 26. The bin sections can collapse or telescope along axis 27 in the rearward direction of arrow R, to release the coal so it can fall into the shuttle car when the car is at the receiving position indicated at 14A. The conveyor device 16 includes a belt 28 and a group of rollers, including a forward roller 30 which can move back and forth in the direction of arrows R and F. As the roller 30 moves, it drops mined material through the open upper ends 31 of the bin sections to fill all major areas of the storage bin.

FIG. 2 illustrates the system at a time when the storage bin is fully extended to receive coal. The forward roller is at the position 30b which is near its forwardmost position 30a. The roller at 30b is then moving rearwardly. FIG. 3 illustrates the system at a time when the shuttle car 14 is approaching the storage bin 18, with the tailgate 32 lowered to pass under the bin. The car can then move to a position to surround much of the bin, so the hopper 34 of the car can receive much of the mined material stored in the bin. At this time, the conveyor device 16 is located with the forward roller at 30c where it has filled most of the bin.

As shown in FIG. 4, when the conveyor device approaches a position at which its roller at 30d is in its rearmost position, and with the shuttle car 14A at its receive position, the storage bin 18 is collapsed or telescoped to dump the mined material 26 into the shuttle car. This is accomplished by moving the front most bin section 20 in a rearward direction so portions of the bottom and side walls of section 20 that extended beyond section 21, now lie below and beside section 21. An upstanding projection 42 on each of the bin sections 20, 21 engages a projection 36 on another section 21 or 22 to drag the bin sections rearwardly. As the bin sections telescope, the mined material is free to fall downwardly and outwardly into the shuttle car. The material falls through a bottom opening 37 left by the telescoping bottom walls 38 of the bin sections. The opening 37 eventually lies under most of the bottom area of the bin. The release of the stored material from the side walls 39 of the bin sections is also helpful in avoiding the dragging behind of material when the shuttle car moves forward.

When the bin has been fully telescoped at the position indicated in phantom lines at 18A, the maximum amount of mined material has been dumped into the car and the car begin moving away in the direction of arrow F. FIG. 5 shows the car at 14 with a load of mined material therein, and with the tailgate 32 raised, so the material can be taken to a central station in the mine. At the same time, the storage bin is being extended, by moving the bin section 20 forwardly, and allowing the projection 40 at the rear of each section to engage a projection 36 on the next section to drag it forwardly. Finally, the bin will have extended to the configuration shown in FIG. 2.

The storage bin includes not only the sections 20–23, but a forward end wall 44. Before a shuttle car arrives, this wall is used to hold in the mined material. However, by the time that the shuttle car arrives, as shown in FIG. 4, the end wall must have been raised as to the position shown at 44A. After the car leaves, the end wall is lowered again.

During the entire cycle of operation, the conveyor device 16 operates continually to move mined material from the mining machine and to dump it into the storage bin. Even in the configurations of the storage bin shown in FIGS. 4 and 5, material continues to be dropped from the front of the belt at roller positions 30d and 30e into the partially or totally telescoped storage bin. Thus, there is no need to stop operation of the mining machine, so long as a shuttle car arrives before the storage bin is completely filled. Also, the shuttle cars have to wait only a relatively short time if they are operated to arrive at times when the storage bin is filled most of the way. When the system is properly operated, the cars 14 arrive when the storage bin is about three-quarters filled. This way, if the shuttle car arrives somewhat later than usual, there is still storage capacity in the bin to allow the mining machine to continue to operate. Thus, there is no need for a car and its driver to wait around during most of the time when the storage bin is being filled.

Figure 6:
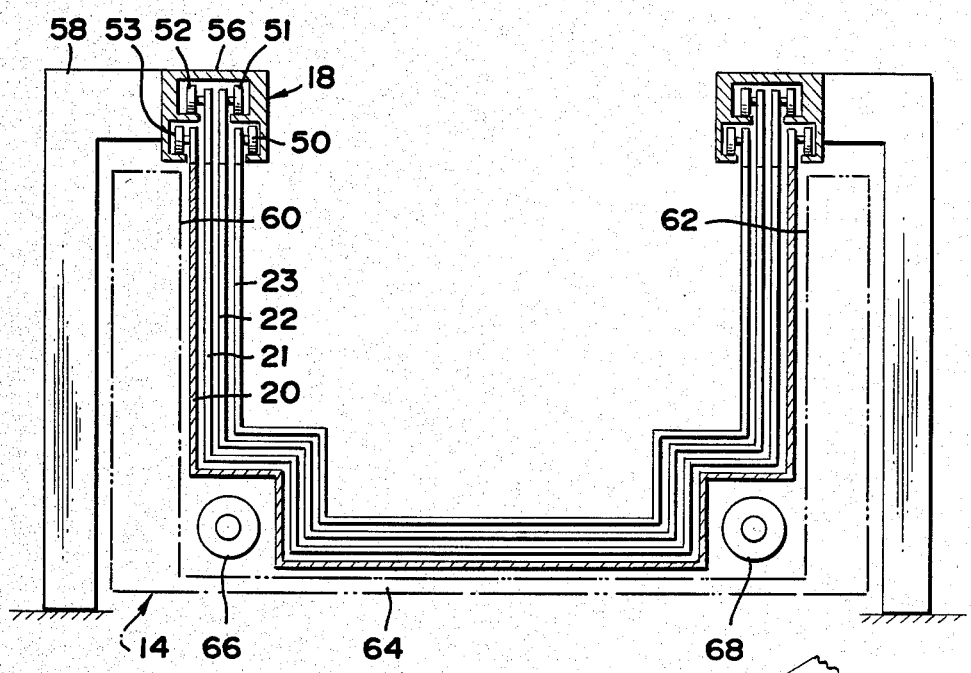
FIG. 6 is a sectional end view of the system of FIG. 1, showing additional details of the system.
Figure 7:
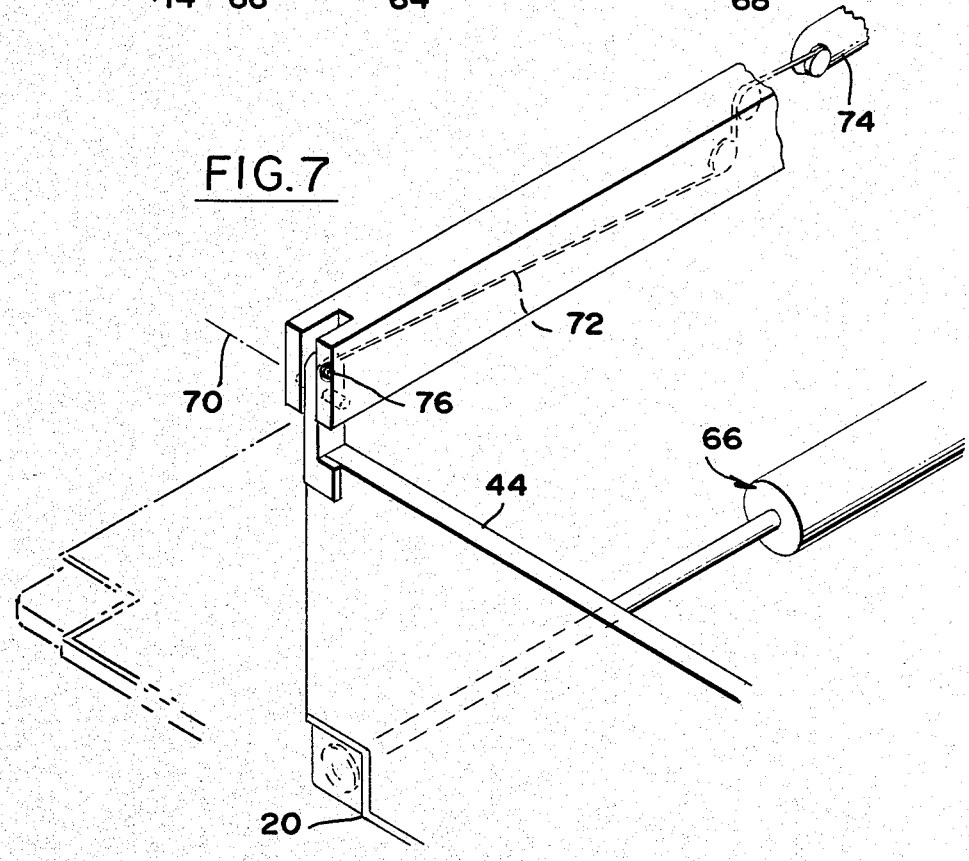
FIG. 7 is a partial perspective view of the system of FIG. 6.

FIGS. 6 and 7 illustrate some of the details of operation of the storage bin 18. The bin sections 20–23 are supported by rollers 50–53 that roll along tracks on a track member 56 that is supported by posts 58. The car indicated at 14 is constructed so its side walls 60–62 lie immediately opposite sides of the storage bin, while its bottom wall 64 lies under the bottom walls of the bin by a distance less than half the height of the car side walls 60, 62. A pair of actuators 66, 68 that are connected to the front most bin section 20, move the bin to collapse and extend it. A variety of actuators are available, such as hydraulic cylinders. The end gate 44 (FIG. 7) can be raised and lowered by a variety of different mechanisms. FIG. 7 shows one example, wherein the gate 44 is pivotally mounted about axis 70 on an extension of the track, and is pivoted up and down through a cable 72 extending to a motor 74. A solenoid armature 76 holds the gate closed.

The forward section of the conveyor which includes the forward roller 30, can be cantilevered, and a strain gauge or load cell can be used to measure the weight of coal on the forward section of the conveyor. Such measurement together with measurement of conveyor belt movement indicates the amount of coal dumped into the bin. A computer can be used to control movement of the roller 30 to load the bin evenly, and to begin reloading when the coal is dumped into a car, all without need for a human operator of the loading system.

Thus, the invention provides a system for use in a mine tunnel of limited height, for storing mined material and transferring it to a shuttle car, to enable mining of material with minimal interruptions and to enable operation of shuttle cars with minimum waiting time near the mine face. This can be accomplished by the use of a storage bin having a bottom wall moveable relative to other walls of the bin, so the bottom wall can be slid in a largely horizontal direction to form an opening under most of the bin area. This allows the stored material to drop out of the bin and into a shuttle car whose bottom wall lies directly under the bottom of the bin. The bin can include a group of telescoping bin sections, so material can fall outwardly and sidewardly out of the bin as it telescopes.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A mineral storage bin apparatus for holding newly mined material for loading it in a shuttle car comprising:

a bin having a plurality of bin sections, including forward and rearward bin sections, which telescope along a largely horizontal axis, said bin sections having side walls, open upper ends for receiving pieces of mined material and bottom walls for supporting the weight of the material; a shuttle car;

means for supporting said bin sections to allow said shuttle car to move thereunder;

said shuttle car, having side walls and having a bottom wall which is thin and low enough to slip under said bin sections while the side walls of the car lie on opposite sides of the side walls of the bin sections, and motor means for driving said car to move it so said bottom wall slips under said bin sections and the side walls of the car lie on either side of the side walls of the bin sections and to then move said car away from said bin;

said forward bin section having an openable forward end, and actuator means coupled to at least one of said sections, for collapsing said sections along said largely horizontal axis including moving said forward bin section rearwardly while its forward end is open, so the material formerly supported by the bottom of a bin section can fall down, to release the material held therein to fall out into said shuttle car lying under the sections.

2. A system for transferring newly mined material comprising:

a storage bin having a bottom and a plurality of walls including a pair of side walls and also including at least a first bottom wall which is moveable;

said bin including a plurality of telescoping bin sections with a first one of said sections having a front end and a front wall which can cover said front end;

means for supporting said bin and moving at least said first bottom wall in a predetermined direction that leaves an opening in the bottom area of said bin out of which material can fall, said means being constructed to move said front wall out of line with said first bin end and to telescope said bin sections along a primarily horizontal direction, so material can fall out of the front end of said first bin section;

bin loading means for loading pieces of mined material into said bin, and a car having a frame with side walls and a bottom wall, said car having support means for supporting said frame in movement to a receive position at which said bottom car wall lies closely under the location of said opening in the bin bottom to catch material dropping out of the opening, and said side walls lie at largely the same height as said bin side walls.

3. A method for transferring newly mined material to a shuttle car comprising:

substantially continually dropping newly mined material into a storage bin;

said bin including a plurality of bin sections, each having a bottom wall and opposite side walls with said bin sections being slideable to telescope and extend said bin;

moving a shuttle car with a holding area wider than said bin, into a receive position at which a bottom wall of the car lies directly under a bottom wall of the bin while the sides of the car holding area lie on either side of the bin and with portions of the side walls of the car and bin lying at the same level;

sliding at least a bottom wall of the bin in a substantially horizontal direction relative to at least one other wall of the bin to form a bottom opening through which the material can fall onto the bottom wall of the shuttle car, and progressively increasing the area of said opening to fully open the bottom of more than half the storage capacity of the bin by sliding an entire bin section including the bottom and side walls thereof to release the mined material to dump it both downwardly and sidewardly into the holding area of the car, and moving the car away from said receive position, and moving said bottom wall of said bin in the direction to close said bottom opening so more material can be held in the bin until a shuttle car is again moved to said receive position.

* * * * *